United States Patent
Nakajima et al.

(10) Patent No.: US 7,873,138 B2
(45) Date of Patent: Jan. 18, 2011

(54) STRUCTURE AND METHOD FOR BOLTING NEUTRON REFLECTOR

(75) Inventors: Makoto Nakajima, Hyogo (JP); Hirokazu Shoumura, Hyogo (JP); Kenji Umeda, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 693 days.

(21) Appl. No.: 10/311,602

(22) PCT Filed: Apr. 25, 2002

(86) PCT No.: PCT/JP02/04164
§ 371 (c)(1),
(2), (4) Date: Dec. 18, 2002

(87) PCT Pub. No.: WO02/089148
PCT Pub. Date: Nov. 7, 2002

(65) Prior Publication Data
US 2008/0285702 A1    Nov. 20, 2008

(30) Foreign Application Priority Data
Apr. 26, 2001 (JP) .............................. 2001-129500

(51) Int. Cl.
*G21C 5/00* (2006.01)
(52) U.S. Cl. ......................... 376/458; 376/459
(58) Field of Classification Search ................ 376/458, 376/459, 287, 389, 390, 400
See application file for complete search history.

(56) References Cited
U.S. PATENT DOCUMENTS

| 4,462,956 A | * | 7/1984 | Boiron et al. ............... 376/287 |
| 4,731,220 A | * | 3/1988 | Kim, Jr. ...................... 376/458 |
| 4,751,043 A | * | 6/1988 | Freeman et al. ............. 376/400 |
| 4,849,162 A | * | 7/1989 | Garner et al. ............... 376/458 |
| 4,941,159 A | * | 7/1990 | Schwirian et al. ........... 376/458 |
| 5,265,141 A | * | 11/1993 | Kobsa ........................ 376/446 |

(Continued)

FOREIGN PATENT DOCUMENTS

EP    0 367 963 A2    5/1990

(Continued)

OTHER PUBLICATIONS

Shomura et al., Radial Neutron Reflector for a Nuclear Reactor, JP 08036080, Feb. 6, 1996.*

(Continued)

*Primary Examiner*—Rick Palabrica
(74) *Attorney, Agent, or Firm*—Oblon, Spivak, McClelland, Maier & Neustadt, L.L.P.

(57) ABSTRACT

A neutron reflector bolt fastening structure is disclosed in which even upon relaxation in the fastening forces thereof being generated in tie rods for divided stage portions as a result of neutron irradiation, it is possible to press the neutron reflector firmly against a core vessel. The neutron reflector bolt fastening structure includes: a neutron reflector which includes of a plurality of divided stage portions and situated in a core vessel in a reactor vessel; a plurality of tie rods for fixing the neutron reflector to the core vessel; and a plurality of bolts for exclusively fixing the lowermost stage portion of the plurality of stage portions of the neutron reflector to the core vessel.

4 Claims, 6 Drawing Sheets

U.S. PATENT DOCUMENTS 5,319,692 A * 6/1994 Hopkins et al. ............. 376/458
5,659,590 A     8/1997 Relf

FOREIGN PATENT DOCUMENTS

| EP | 0 576 195 A1 | 12/1993 |
| GB | 1 271 594 | 4/1972 |
| JP | 56-120981 | 9/1981 |
| JP | 6-160575 | 6/1994 |
| JP | 8-15474 | 1/1996 |
| JP | 08-036080 * | 2/1996 |
| JP | 8-36080 | 2/1996 |

OTHER PUBLICATIONS

Patent Abstracts of Japan, JP 08-036080, Feb. 6, 1996 (reference previously filed in Japanese language on Apr. 21, 2003).

* cited by examiner

STRUCTURE AND METHOD FOR BOLTING NEUTRON REFLECTOR

FIELD OF THE INVENTION

The present invention relates to an in-pile structure in a reactor vessel of a nuclear power plant and, in particular, to a neutron reflector bolt fastening structure to be used when securing in position a neutron reflector within a core vessel. The present invention also relates to a fastening method for the fastening structure.

BACKGROUND OF THE INVENTION

FIG. 3 is a schematic longitudinal sectional view showing the general construction of an ordinary nuclear reactor. In the drawing, a reactor vessel 10 is equipped with a core vessel 12 in which a fuel assembly 14 is supported. The fuel assembly 14 in the core vessel 12 is surrounded by an upper core plate 16 on the upper side, by a lower core plate 18 on the lower side, and by a neutron reflector 20 at the periphery.

Next, the assembly structure of this neutron reflector will be described with reference to FIG. 4. The neutron reflector 20 is formed by vertically stacking together eight substantially annular stage portions, which are fastened by eight tie rods 22 that are circumferentially arranged. The positioning when assembling each stage portion is effected by a positioning pin 23. The lowermost stage portion 20A of the neutron reflector 20 has at the periphery thereof four flange portions 201 (only two of which are shown in the drawing); similarly, the top stage portion 20C has four flange portions 202 at the periphery thereof.

As shown in FIG. 5, the tie rods 22 extend through the neutron reflector 20 from the top stage portion 20C to the lowermost stage portion 20A. The lowermost end portions of the tie rods 22 are passed through the lower core plate 18 and screwed into a flange portion 13 formed in the core vessel 12. To the upper end portion of each tie rod 22, there is mounted a nut 24 for pressing down the upper surface of the top stage portion 20C of the neutron reflector. By turning these nuts 24, the neutron reflector 20 is tightened between them and the lower core plate 18, and is secured to the flange portion 13 of the core vessel 12 through the intermediation of the lower core plate 18.

The neutron reflector 20 has a large number of flow holes for cooling, through which cooling water flows. FIG. 6 shows a structure of inlet portions of the flow holes 204 in the lowermost stage portion 20A of the neutron reflector 20. In the drawing, plugs 181 are provided in the lower core plate 18 mounted to the flange portion 13 of the core vessel 12. Cooling water flowing in through these plugs 181 passes orifices 203 provided in the lowermost stage portion 20A of the neutron reflector 20 and flows upwards through the flow holes 204. These flow holes extend through the 8-stage neutron reflector 20 from the lowermost stage portion 20A to the top stage portion 20C, so that the cooling water flowing in through the orifices 203 of the lowermost stage portion 20A rises through the flow holes 204 to flow out through the flow holes of the top stage portion 20C of the neutron reflector 20.

Where the coolant water passes through the orifices 203 of the lowermost stage portion 20A, a pressure loss is generated, and, due to this pressure loss, a great lifting force is applied to the entire assembly structure of the neutron reflector 20. Most of this lifting force is generated when the cooling water passes through the orifices 203 of the lowermost stage portion 20A, and the force applied to the remaining seven stage portions, that is, from the second stage portion 20B to the top stage portion 20C is relatively small. In view of this lifting force, the eight tie rods 22 are fastened to thereby press the neutron reflector 20 against the lower core plate 18.

However, in a conventional structure, in which the neutron reflector 20 is pressed against the lower core plate 18 by the eight tie rods 22, when relaxation or loosening is generated in the tie rods 22 as a result of neutron irradiation, there is a possibility of the fastening force for pressing down the neutron reflector 20 against the lifting force falling short of the required level.

OBJECT OF THE INVENTION

Thus, it is a principal object of the present invention to provide a neutron reflector bolt fastening structure capable of firmly pressing the neutron reflector against the flange portion of the core vessel through interconnection with the lower core plate even if relaxation is generated in the tie rods as a result of neutron irradiation, as well as a fastening method for the structure.

SUMMARY OF THE INVENTION

According to a main aspect of the present invention, a neutron reflector bolt fastening structure is characterized by including:

a neutron reflector composed of a plurality of divided stage portions and situated in a core vessel in a reactor vessel;

a plurality of tie rods for fixing the neutron reflector to the core vessel; and a plurality of bolts for solely fixing the lowermost stage portion of the plurality of stage portions of the neutron reflector to the core vessel.

According to another aspect of the present invention, a neutron reflector bolt fastening method is characterized by including:

fixing a neutron reflector composed of a plurality of divided stage portions and situated in a core vessel in a reactor vessel to the core vessel by means of a plurality of tie rods; and fixing the lowermost stage portion of the plurality of stage portions of the neutron reflector solely to the core vessel by means of a plurality of bolts.

In accordance with the present invention, the lowermost stage portion, to which most of the lifting force on the entire neutron reflector is applied, is exclusively secured to the core vessel by means of bolts other than the tie rods, whereby the initial fastening force for the lowermost stage portion of the neutron reflector becomes very large. Thus, even if relaxation is generated in the tie rods as a result of neutron irradiation, it is possible to press the neutron reflector firmly against the core vessel.

DESCRIPTION OF THE PREFERRED EMBODIMENT

Figure 1:
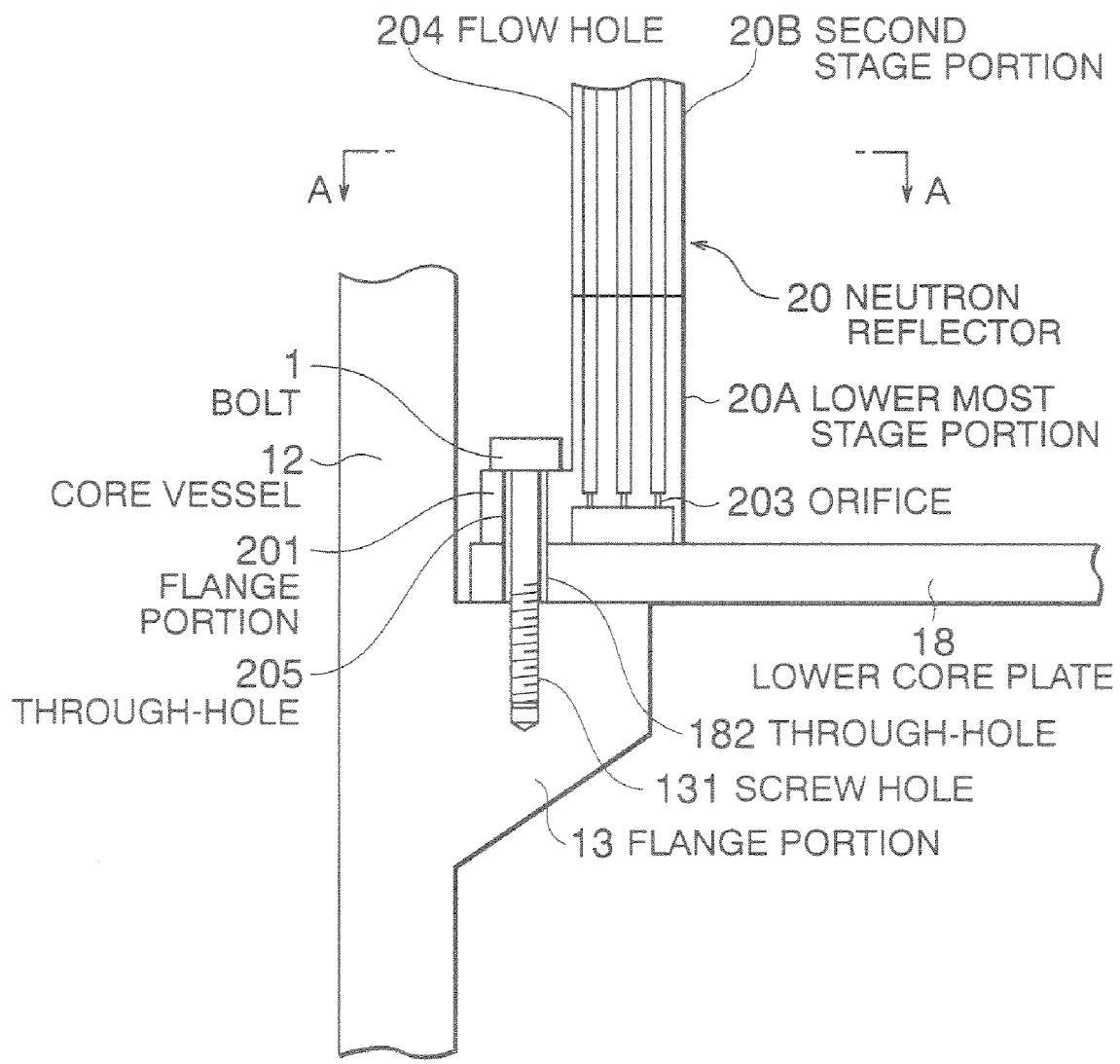
FIG. 1 is a schematic diagram showing a neutron reflector fastening structure according to the present invention.

Next, a preferred embodiment of the present invention will be described with reference to the accompanying drawings, in which the components which are the same as or equivalent to those of the conventional structure are indicated by the same reference numerals.

Figure 2:
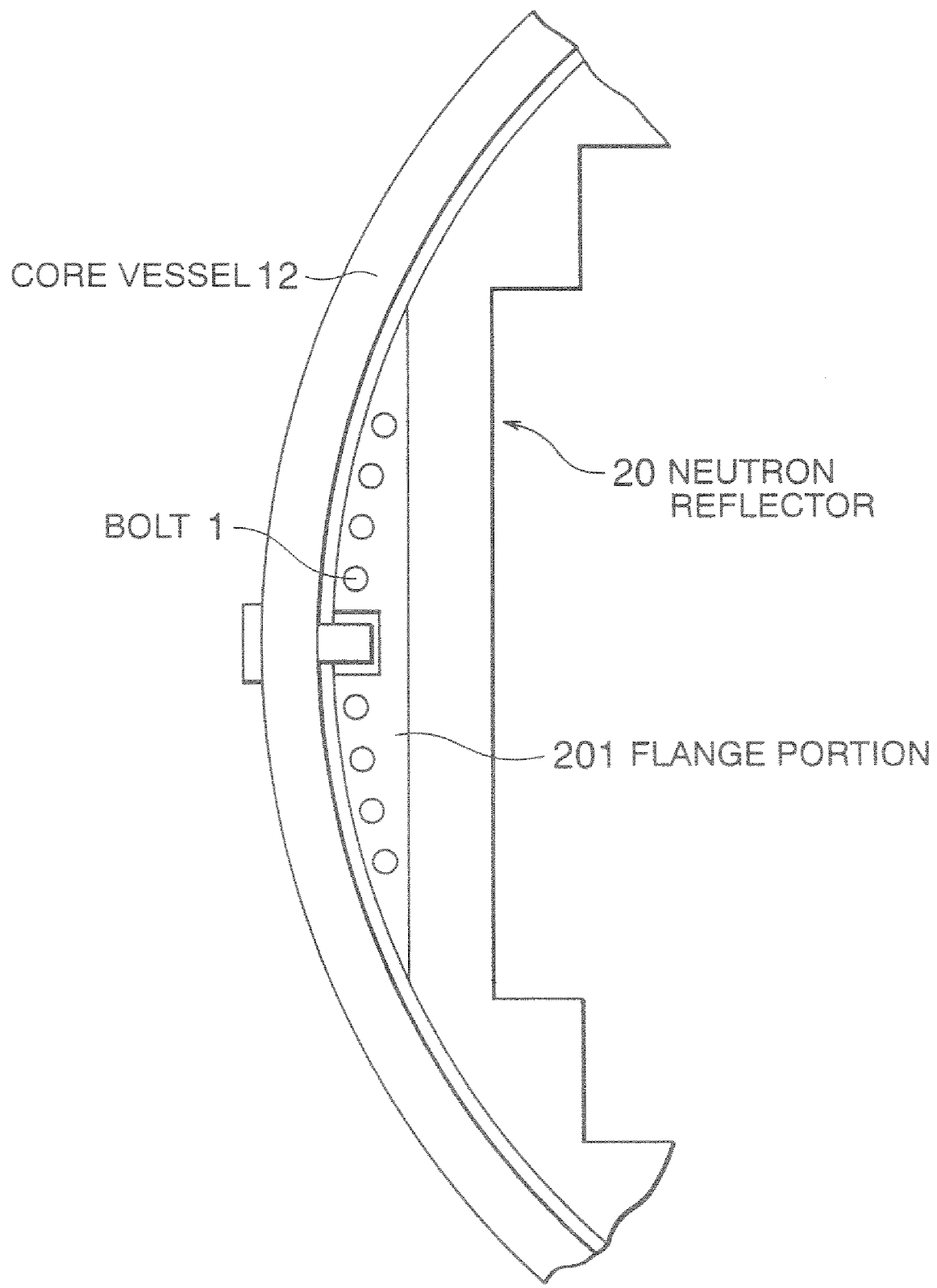
FIG. 2 is an end view taken along the line A-A of FIG. 1.
Figure 3:
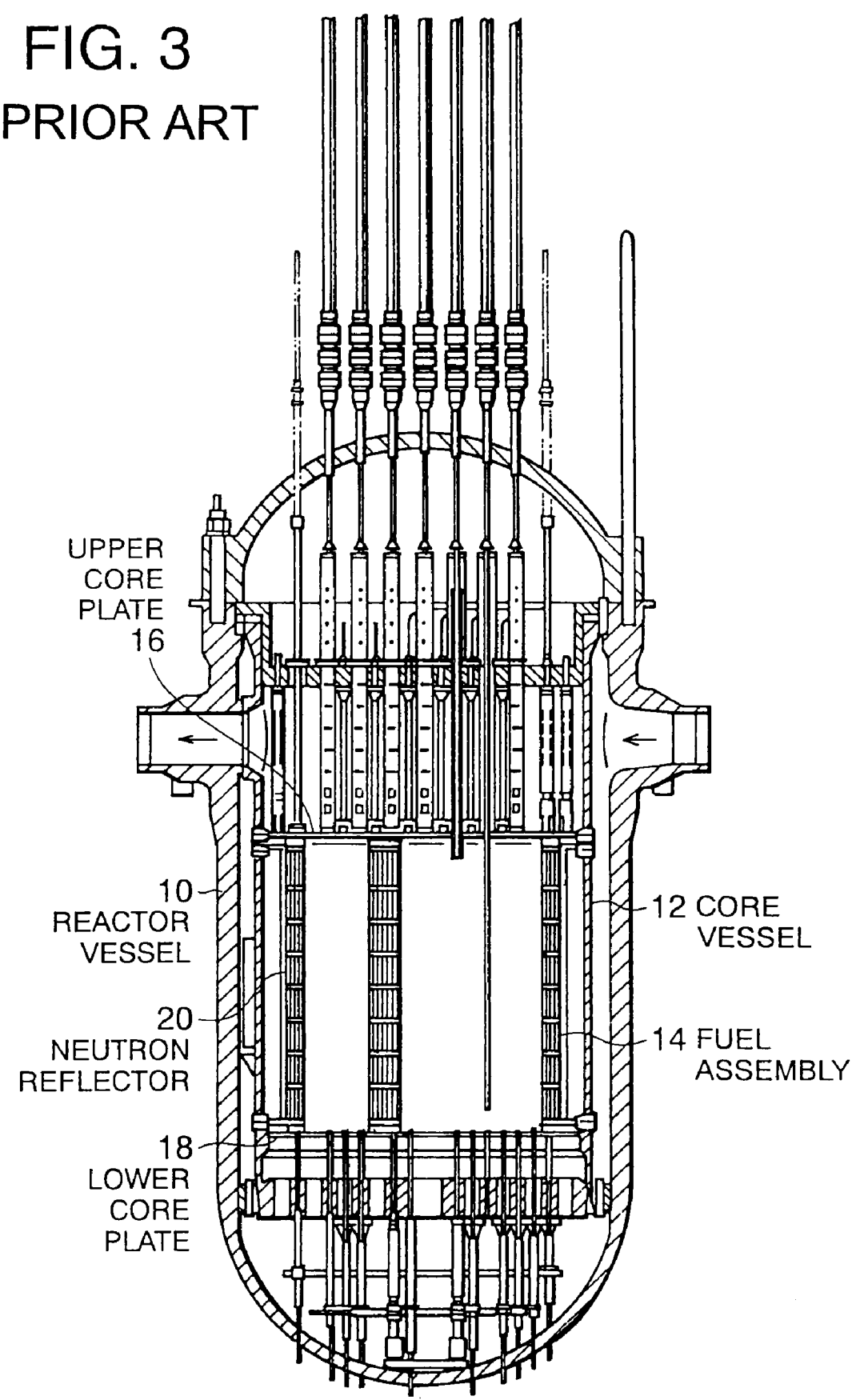
FIG. 3 is a schematic longitudinal sectional view showing a general construction of an ordinary nuclear reactor.

FIG. 1 is a schematic diagram showing a neutron reflector bolt fastening structure according to the present invention, and FIG. 2 is an end view taken along the line A-A of FIG. 1. In these drawings, the lowermost stage portion 20A of the neutron reflector 20 has flange portions 201, which has through-holes 205 for bolts 1. Further, the lower core plate 18 situated under the neutron reflector 20 also has through-holes 182 for the bolts 1. The flange portion 13 of the core vessel 12 supporting the neutron reflector 20 and the lower core plate 18 has screw holes 131 into which bolts 1 are to be fitted. By using the bolts 1, the lowermost stage portion 20A of the neutron reflector 20 is fastened to the flange portion 13 of the core vessel 12 through the intermediation of the lower core plate 18.

Figure 4:
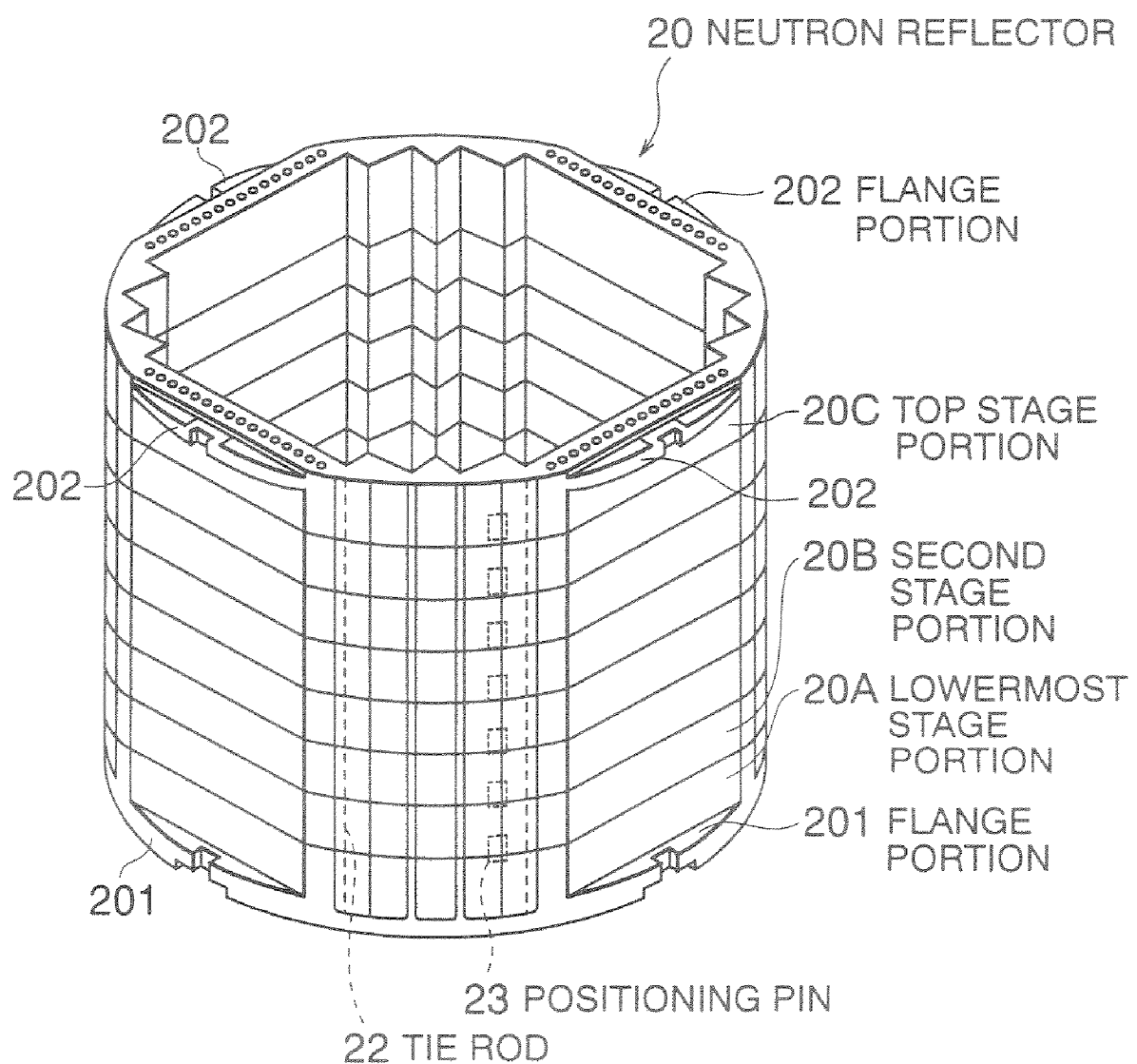
FIG. 4 is a perspective view showing an assembly construction of a neutron reflector.
Figure 5:
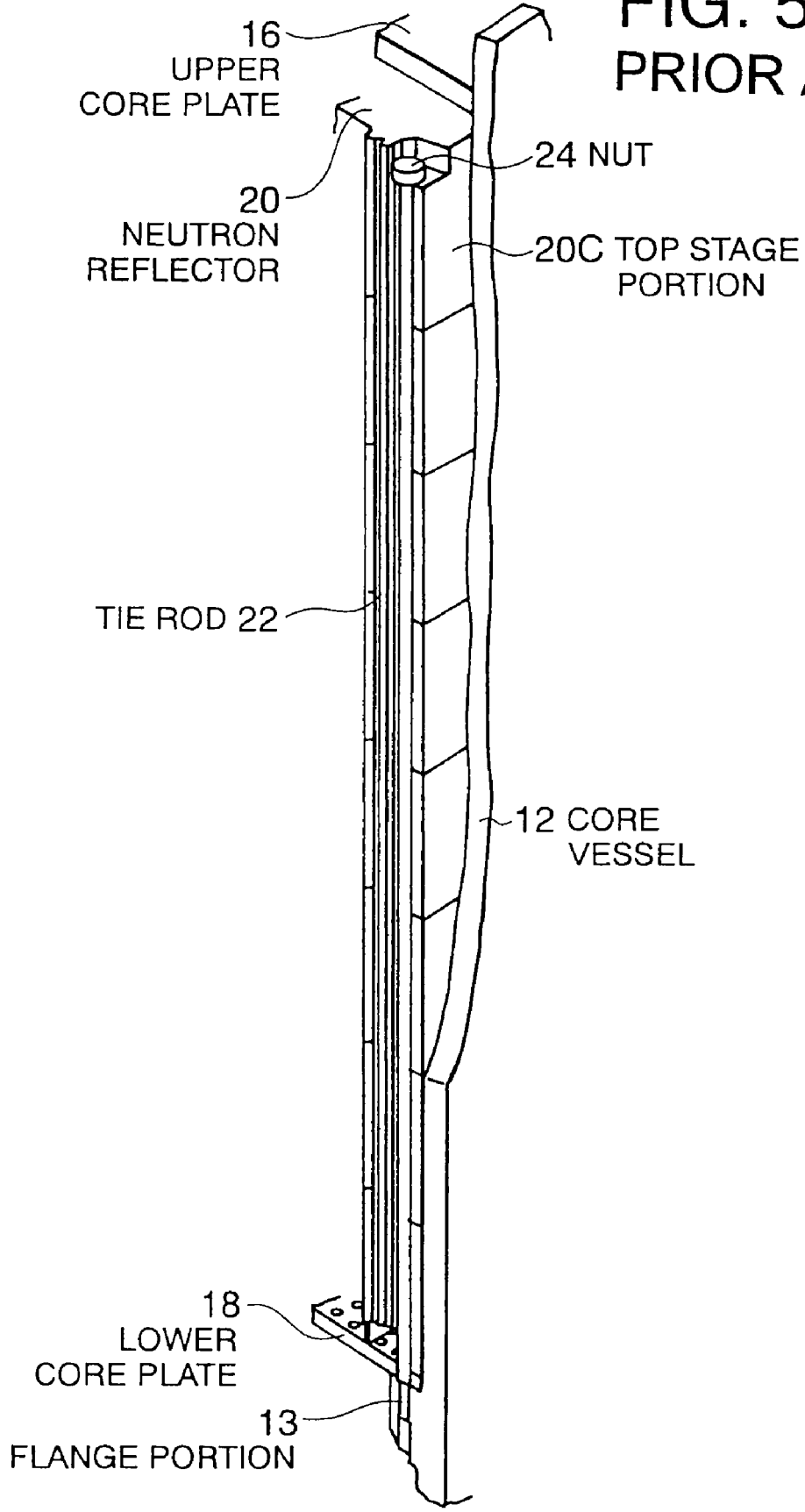
FIG. 5 is a schematic diagram showing a conventional fastening structure for a neutron reflector.
Figure 6:
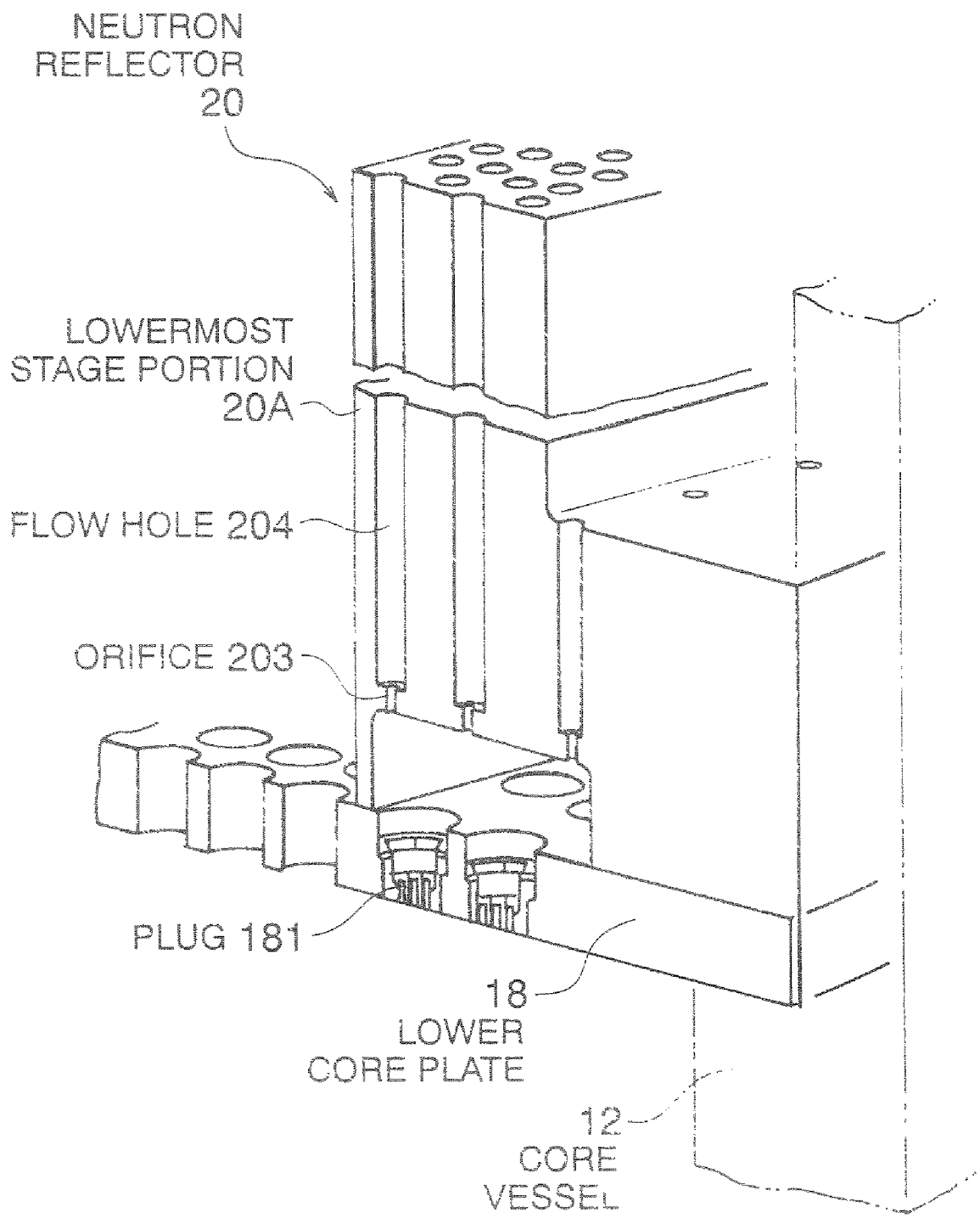
FIG. 6 Is a schematic diagram showing a structure of flow hole inlet portions in a lowermost stage portion of a neutron reflector.

In this embodiment, there are provided eight holes 205, 182, and 131, and eight bolts 1 for each flange portion 201 formed on the lowermost stage portion 20A. Namely, four flange portions 201 are provided (See FIG. 4), so that the lowermost stage portion 20A of the neutron reflector 20 is fastened to the flange portion 13 by a total of 32 bolts.

When fastening the neutron reflector by utilizing this neutron reflector bolt fastening structure, the entire 8-stage neutron reflector 20 is fastened to the core vessel 12 by the conventional eight tie rods 22 and, at the same time, the lowermost stage portion 20A of the neutron reflector 20 is solely fastened to the flange portion 13 of the core vessel 12 by means of a large number of bolts 1 according to the present invention.

In this manner, the lowermost stage portion 20A of the neutron reflector 20, to which most of the lifting force is applied, is solely fixed to the core vessel 12 exclusively by means of a plurality of bolts which are separate from and independent of the tie rods 22, whereby it is possible to secure in position the lowermost stage portion 20A of the neutron reflector 20 with a much larger initial fastening force as compared with the force obtained from the eight tie rods 22. Thus, even if relaxation is generated in the tie rods 22 as a result of neutron irradiation, and the fastening force is reduced, it is possible to maintain a sufficient fastening force to cope with the lifting force since the initial fastening force of the large number of bolts 1 is sufficiently large. As a result, it is possible to maintain the neutron reflector 20 in a state in which it is pressed against and fixed to the flange portion 13 of the core vessel 12.

Regarding the remaining seven stage portions of the neutron reflector 20, the lifting force applied thereto is relatively small as compared with that applied to the lowermost stage portion 20A, so that the fastening with the conventional eight tie rods 22 suffices. Even if relaxation is generated in the tie rods and their axial force is weakened, it is possible to maintain the requisite fastening force.

In the present invention, the bolts 1 are fastened where the amount of neutron irradiation amount, so that it is possible to prevent a deterioration in fastening force due to relaxation, thus making it possible to reliably maintain the requisite fastening force.

While in the above-described embodiment all the four flange portions 201 of the neutron reflector 20 are fastened to the flange portion 13 of the core vessel 12 through the intermediation of the lower core plate 18 by means of the bolts 1, it is also possible to fasten only two opposing flange portions 201. Further, while in the above-mentioned embodiment eight bolts 1 are used for each flange portion 201, the number of bolts for each flange portion may be more or less than eight as long as they provide a predetermined initial fastening force.

The invention claimed is:

1. A reactor vessel comprising:
   a neutron reflector;
   a lower core plate;
   a core vessel, the core vessel including a flange portion extending in a direction towards the neutron reflector; and
   a neutron reflector bolt fastening structure, the neutron reflector bolt fastening structure including:
      a plurality of divided stage portions composing said neutron reflector which is situated in said core vessel in said reactor vessel;
      a plurality of tie rods that fix said neutron reflector to said core vessel; and
      a plurality of bolts that fasten solely a lowermost stage portion of said plurality of stage portions of said neutron reflector to said core vessel,
   wherein said lowermost stage portion of said neutron reflector includes a plurality of flange portions extending in a direction towards the core vessel and positioned above the lower core plate, and
   wherein the plurality of bolts are configured to extend through each of the plurality of flange portions of the lowermost stage portion and the lower core plate, and the plurality of bolts extend partially into the flange portion of the core vessel positioned below the lower core plate, to secure the lowermost stage portion of the neutron reflector to the core vessel.

2. The reactor vessel according to claim 1, wherein said plurality of flange portions of the lowermost stage portion are arranged at opposing positions in the outer periphery of said lowermost stage portion of said neutron reflector.

3. The reactor vessel according to claim 1, wherein four of said flange portions of the lowermost stage portion are arranged at equal intervals in the outer periphery of said lowermost stage portion of said neutron reflector.

4. A method for fastening a neutron reflector comprising:
   fixing a neutron reflector composed of a plurality of divided stage portions and situated in a core vessel in a reactor vessel to said core vessel by means of a plurality of tie rods; and
   fastening solely a lowermost stage portion of said plurality of stage portions of said neutron reflector to a flange of said core vessel by means of a plurality of bolts, in which said plurality of bolts extend through each of a plurality of flanges of the lowermost stage portion and a lower core plate located below the plurality of flanges of the lowermost stage portion, and the plurality of bolts extend partially into a portion of the flange of the core vessel that extends in a direction of the neutron reflector and is located below the lower core plate, such that the lowermost stage portion is fastened to said flange of the core vessel.

* * * * *